Jan. 5, 1932. J. B. REPLOGLE 1,839,264
SEAL
Filed Aug. 23, 1929

Inventor
JAMES B. REPLOGLE.

By Wayne M. Hart
Attorney

Patented Jan. 5, 1932

1,839,264

UNITED STATES PATENT OFFICE

JAMES B. REPLOGLE, OF DETROIT, MICHIGAN, ASSIGNOR TO JAMES B. REPLOGLE LABORATORIES, INC., OF BOSTON, MASSACHUSETTS, A CORPORATION OF MASSACHUSETTS

SEALS

Application filed August 23, 1929. Serial No. 387,964.

This invention relates to seals and more particularly to seals for forming a leak proof joint.

An object of the invention is to provide a seal between a rotating shaft and a stationary casing through which the shaft extends.

Another object of the invention is to provide a seal structure in which rigid elements frictionally contact and move relatively without noise.

Still another object of the invention is to provide a seal in which leak proof contact is formed between two rigid elements without unusual manufacturing process.

A further object of the invention is to provide a seal in which yielding material forms one of the sealing elements.

Other objects of the invention, more or less incidental or ancillary to the foregoing will appear in the following description which sets forth in connection with the accompanying drawings a preferred embodiment of the invention.

Figure 2:
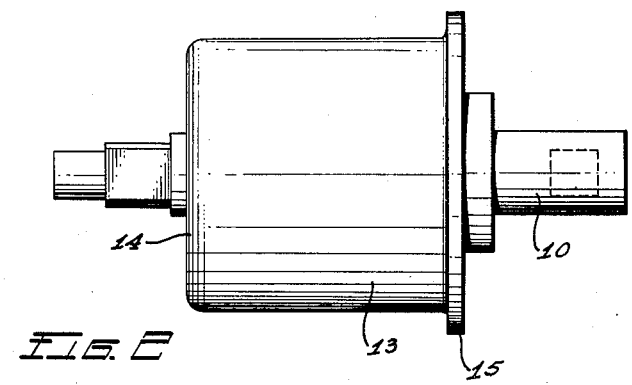
Figure 1:
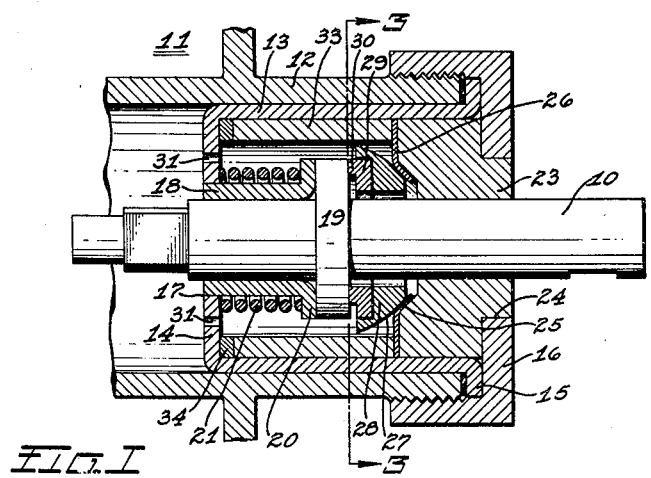
Figure 3:
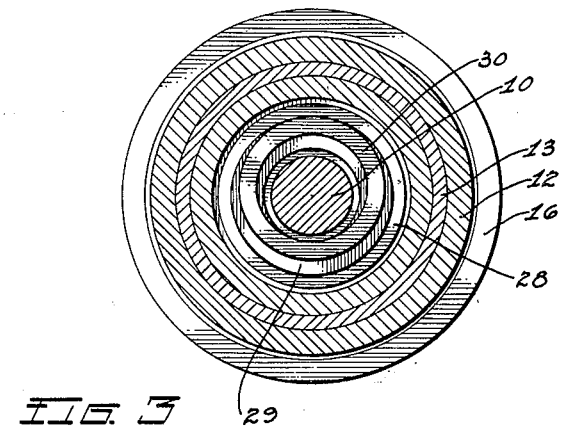

In the drawings, Fig. 1 is a vertical sectional view of a structure embodying the invention; Fig. 2 is a side elevation of the same with the casing removed; and Fig. 3 is a sectional view taken on line 3—3 of Fig. 1.

Referring now to the drawings by characters of reference, 10 represents a driven shaft which extends through a casing 11. The casing is that of a refrigeration compressor, and it will be seen to have a hub portion 12 for supporting the shaft and the seal structure. In order to prevent leakage of gas between the rotatable shaft and the casing through which it projects, I provide a seal which forms the subject of this invention.

A cylindrical seal housing 13 is arranged to extend within and fit snugly in the hub, the housing being formed with an integral inner wall 14 and an open outwardly flanged outer end 15. The flange overlies the outer end of the wall hub and is clamped thereagainst by the cap 16 which is internally threaded to screw upon the threaded periphery of the hub. The end wall 14 of the housing is provided with a central aperture 17 of sufficient size to allow the shaft 10 to project therethrough and to receive the sleeve end 18 of a cylindrical bearing snugly therein. The shaft is formed with a flange 19 forming a shoulder against which the flanged end 20 of the bearing is held by the coil spring 21. The spring encircles the bearing sleeve and engages against the end wall 14 of the housing and the bearing flange under pressure.

A bearing member fits in the outer open end of the housing and is provided with a central bore through which the shaft 10 extends, the outer end 23 of the bearing is reduced and projects through an aperture 24 in the cap 16. The inner face of the bearing member is provided with a recess 25 surrounding the bore, and a ring member 26 is arranged adjacent the inner face of the bearing member. The ring member extends into the recess 25 in the bearing and the aperture therethrough is of larger diameter than the shaft. The ring member 26 is preferably formed of a pressure deformable material such as celluloid and provides a circular seat when the spherical face 27 of one section of the seal is pressed thereagainst. The spherical face 27 is of a form such that it will project partially into the recess 25 and press the central portion of the ring 26 against the bearing recess face thereby forming a circular contact seal around the shaft. The celluloid is normally stiff, but is deformable enough to compress sufficiently to compensate for manufacturing inaccuracies so that the annular contact will be maintained when the seal section 28 is pressed thereagainst even though the spherical face is not perfect. The recess 25 in the bearing allows the overlying portion of the ring to flex slightly therein thus tightly engaging the bearing wall when the seal section is pressed thereagainst.

The seal member is formed in two sections 28 and 29 which have a bore larger in diameter than the shaft 10 projecting therethrough. The inner end of the seal section 29 is formed with an axially projecting endless eccentric flange 30 which bears against the outer face of the shaft flange 19. The end of the housing 14 is provided with a plurality of circularly arranged apertures 31 through which gas and oil within the casing 11 can enter, the oil being free to circulate in the seal housing providing lubrication for the abutting faces of the seal section 29 and the shaft flange which prevents wear and eliminates any squeak or squeal usually present when two unlubricated metal elements are in rubbing contact. The eccentric face 30 will keep the entire flange face with which it contacts constantly covered with oil due to the changing area thereof with which it contacts. The section 29 of the seal member fits partially into a recess in the section 28 and is integrally secured thereto by metal holding cement. The section 28 is preferably formed of steel while the section 29 is preferably formed of babbit and graphite.

It will be seen that the housing 13 is secured to the casing, and that it serves at its inner end as an anchor for the coil spring 21 which exerts pressure against the flange 20 and the shaft flange thereby pressing the spherical face of the seal against the ring which will bear against the bearing, thus making a leak proof joint around the shaft. The coil spring normally exerts sufficient pressure against the seal to hold the joint tight but as the pressure increases it will assist in maintaining the leak proof relation of the sealing elements. Because of the material of which it is formed which contacts with the rotating steel shaft, the eccentric flange 30 will become lapped into perfect seating relation. Also, the spherical face of the seal 27 will always seat even though the position of the seal member varies from its initial position. The sleeve 18 serves as a bearing for the shaft, aligns its inner end radially and acts as a thrust bearing for the shaft flange so that the shaft is supported by the two spaced bearings 18 and 22.

A deformable washer 34, preferably formed of celluloid, is arranged adjacent the inner wall 14 of the housing and a spacer sleeve 33 extends intermediate this washer and the celluloid ring 26. The cap 16 when screwed on the casing, moves the bearing 22 to press the celluloid members and the spacer together so that a leak proof joint or seal is made around the bearing 22 from within the housing. As the housing fits tightly in the casing and the flange 15 is pressed tightly against the end of the casing there can be no leakage between the cap and the casing around the exterior of the housing.

The sealing member is arranged and formed so that its angular and lateral relation can be varied without affecting its leak proof relation. The angular position is controlled by the relation of the flange 30 with the shaft flange, which can be self adjusting without affecting the circular contact of the spherical seal face with the ring and bearing. The spherical seal face controls the lateral relation of the seal, and this can be varied without affecting the leak proof relation thereof.

The structure is compact, noiseless and leak proof, and becomes more efficient with increased pressure and use, such seal being of especial value when used to seal a compressor shaft with a casing so that the refrigerant gases will not escape.

Various changes can be made in the details of the structure described without departing from the spirit of the invention and the scope of the claims.

What I claim is:

1. In a compressor, a casing having an aperture therethrough, a shaft extending through the aperture in the casing, said shaft having an annular shoulder, a deformable ring member encircling the shaft within the casing, a retainer for the ring member, and a pressure retained seal member encircling the shaft and engaging the ring and the shaft shoulder.

2. In a compressor, a casing having an aperture therethrough, a shaft extending through the aperture in the casing, said shaft having an annular shoulder, a celluloid ring member encircling the shaft, a retained shaft bearing against which the ring engages, a seal member encircling the shaft and engaging the ring and the shaft shoulder, and pressure means forcing the seal into the ring member.

3. In a compressor, a casing having an aperture therethrough, a shaft extending through the aperture in the casing, said shaft having an annular shoulder, an apertured ring member encircling the shaft within the casing aperture, a retainer for the ring closing one end of the aperture in the casing, a seal member having a spherical end engaging the ring member and closing the aperture therein, an eccentric endless flange on the other end of said seal member engaging said shoulder around the shaft, and pressure means retaining the ends of said seal member in frictional engagement with the shoulder and the ring member.

4. In a compressor, a shaft having a shoulder, a seal member encircling the shaft and engaging against the shoulder, a deformable ring with which said seal engages, a bearing against which the seal presses the ring angularly around the shaft, and pressure means maintaining the seal in said relations, said seal being adjustable laterally and angularly without affecting the leak proof contacts formed thereby.

In testimony whereof, I hereunto affix my signature this 15 day of August, 1929.

JAMES B. REPLOGLE.